United States Patent Office 2,855,661
Patented Oct. 14, 1958

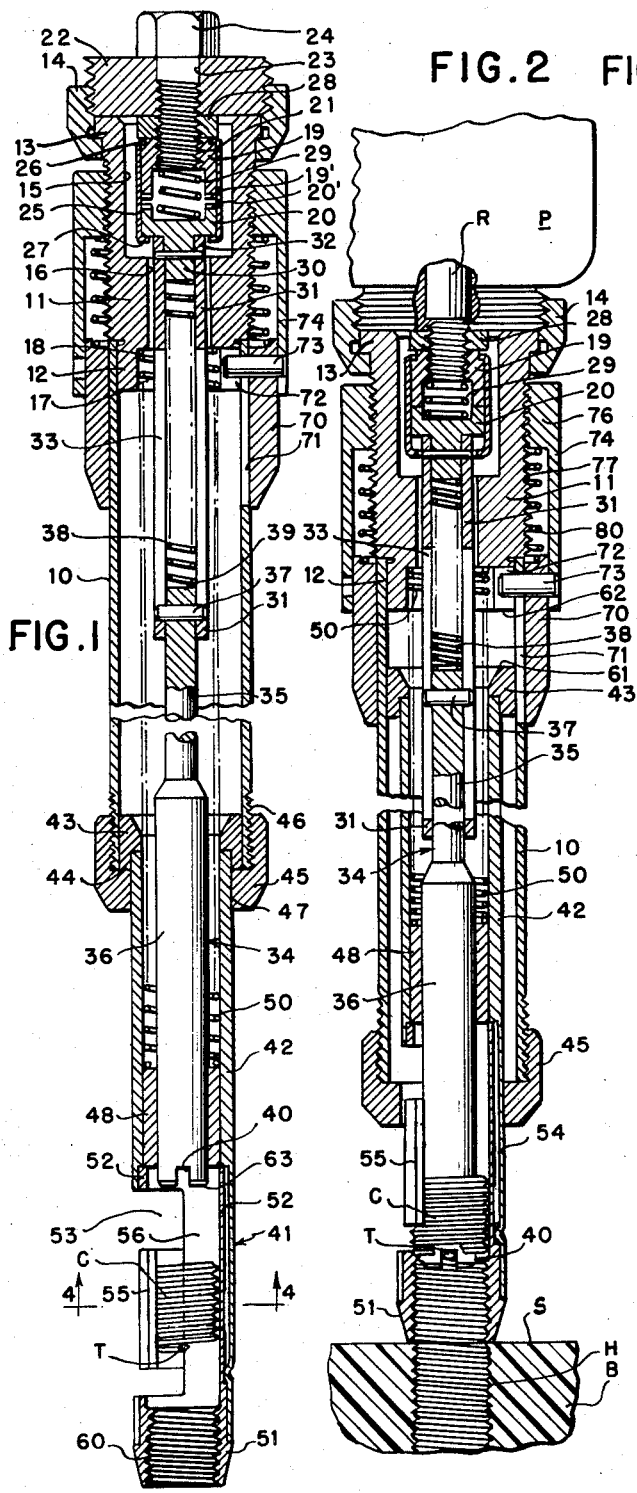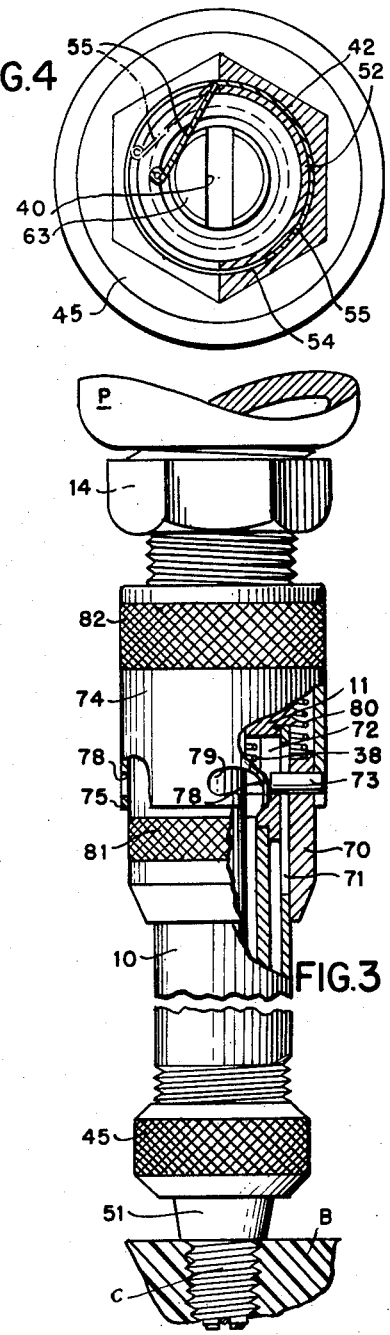

2,855,661

POWER INSERTING TOOL

John O. Forster, Harrison, N. Y., assignor to Heli-Coil Corporation, Danbury, Conn., a corporation of Delaware Application October 19, 1953, Serial No. 386,970

2 Claims. (Cl. 29—240.5)

The invention relates to a power-driven tool for inserting a screw thread member into an internally threaded boss or nut. A tool according to the invention may be so designed as to be used with ordinary bolts or studs. However, it is believed, that its main field of use will be where it is intended to apply a wire coil screw thread insert as a highly wear-resistant thread-forming lining or bushing to a hole in an element provided with an inner thread.

A tool for the indicated purpose is disclosed e. g. in U. S. patent to Hawkins No. 2,511,622. However, the conventional tool according to this patent has certain drawbacks, especially in view of the fact that frequently the arbor which has to drive the screw-thread member for inserting does not properly engage or even injures that member since the primary engagement of the two parts occurs while the one is stationary and the other one rotates.

The invention aims therefore to provide a tool for the indicated purpose in which the screw thread member to be inserted is protected from an impact of rotation of the driving element or arbor of the tool.

Another object of the invention is the provision of a power inserting tool of the mentioned type wherein the depth to which the screw thread member is intended to be inserted, can be adjusted with greater accuracy than hitherto possible.

The invention also contemplates the provision of improved means whereby the depth adjustment can be made without the aid of an additional instrumentality and whereby the adjusted parts can be safely locked in the adjusted position.

The invention further aims to provide means whereby all parts of the tool are automatically restored to their original position so that the tool is ready to receive and operate on another screw thread member when a preceding job has been completed.

Further details and objects of the invention will be apparent from the description given hereinafter and the accompanying drawing illustrating an embodiment thereof by way of example.

In the drawing,

Fig. 1 is a longitudinal section of a tool according to the invention, the tool being in an inoperative position, Fig. 2 is a cross section similar to Fig. 1 of the same tool in a position of use, Fig. 3 is a side elevation partly in section of the tool at the end of its operation with depth adjustment, and Fig. 4 is a cross section along line 4—4 of Fig. 1 on a larger scale.

Referring now to the drawing the illustrated embodiment is a tool for inserting a tang-provided wire-coil screw thread insert C in which the diametrical tang T provides a grip engageable by an element of the tool in order to apply a torque to the coil end which is leading during the insertion. The tool comprises a hollow cylindrical body 10 into which a head piece 11 is inserted with a reduced neck portion 12 and brazed or otherwise secured to the body 10. At its opposite end, the head piece forms a flange 13 engaged by a nut 14 serving to connect the parts 10 and 11 stationarily to the stationary part P of a prime mover as shown in Fig. 2. The head 11 is provided with an axial bore consisting of three portions 15, 16 and 17 of different diameters. The first portion 15 extending from the flanged end of the head piece is the largest as to diameter and axial length, the second portion 16 has the smallest diameter and the third portion 17 is rather short and of a diameter slightly larger than portion 16 so as to form a shoulder 18. A disengageable dog clutch comprising the clutching elements 19 and 20 is arranged within the head bore portion 15. For a reason to be explained later, the teeth or dogs 19' and 20' of the clutch elements are so shallow that once they engage one another the slightest axial movement of the element 20 will disengage the clutch. The element 19 is provided with an inner screw thread 21 for engagement with the rotatable shaft R of the mentioned prime mover. In Fig. 1 where the tool is not in use and detached from the prime mover, a wooden plug 22 with an axial bore 23 is screwed into the nut 14, and a screw bolt 24 inwardly projecting through the hole 23 is screwed into the clutch element 19. The plug 22 and screw bolt 24 prevent foreign matter from entering the interior of the head 11; they will be removed when the tool is to be attached to the stationary part and the shaft of the prime mover as stated hereinbefore. Both clutch elements are encompassed by a sheet metal housing 25 which defines by its inner end flanges 26 and 27 the disengaged, relative end positions of the clutch elements and which holds the elements axially aligned. A nut 28 having the same thread dimensions as the thread 21, is screwed on the bolt 24 or on the prime mover shaft so as to clamp the flange 26 between the nut 28 and the clutch element 19. A spring 29 bears against both clutch elements and tends to hold them apart. The clutch element 20 has a tail or shank end 30 which engages into a tube 31 and is secured thereto by any suitable means such as the transverse pin 32 so that the tube constitutes an extension of the clutch element 20. The tubular extension 31 is provided with two longitudinal slots 33. A mandrel, in general denoted by 34 comprising a neck portion 35 and a body portion 36 can slide with its neck portion 35 telescopically within the tubular extension 31, and a transverse pin 37 secured to the neck portion and guided in the longitudinal slots 33 connects the mandrel with the clutch element 20 for common rotation. A compression spring 38 is arranged interiorly of the tubular extension between the tail end 30 of the clutch element 20 and the ultimate end 39 of the mandrel neck 35. The opposite end of the mandrel body 36 is so formed as to engage a screw member to be inserted in a nut or boss. In the illustrated embodiment where it has been assumed that the tool is to be used for inserting tang-provided screw thread wire coils, the end of the mandrel body is slotted as shown at 40 so that the tang T of the coil C can be engaged in the slot. If the tool is to be used for other screw members the mandrel body end would be correspondingly formed.

On account of the kind of screw members for which the illustrated tool is intended to serve, a prewinder in general denoted by 41 is connected therewith. This prewinder is substantially of the type disclosed in U. S. patent to Evans No. 2,316,231. The prewinder comprises a tubular body 42 to the one end of which a flange-like piece 43 forming an outer shoulder 44 is brazed. However, it is of course possible, too, to form the parts 42 and 43 as one piece. The outer face of the flange piece 43 fits slidingly into the tool body 10, and the inner diameters of the tube 42 and piece 43 are similar to the inner diameter of the tool head portion 12 for reasons to be explained hereinafter. A retainer nut 45 is screwed on an external thread 46 provided at the foot end of the body 10. Nut 45 has a hexagonal bore 47 inwardly projecting with respect to the thread 46. Thus, the nut constitutes an abutment for the shoulder 44 and encompasses the prewinder body 42 which is of an outer hexagonal cross-section to be guided non-rotatably when body 42 is telescopically shifted with respect to the tool body 10. Into the prewinder body 42, approximately half way between the prewinder ends, a short tubular piece 48 is inserted and secured in position by means not shown e. g. by brazing. Piece 48 has an inner diameter equal to the outer diameter of the mandrel body 36 which is guided therein. Its upper end face supports a compression spring 50 which bears with its opposite end on the aforementioned shoulder 18 of the head piece 11. This spring is a means to return the parts of the tool to their initial position of Fig. 1 once the tool is removed from a finished job. The prewinder further comprises a foot piece 51 with a neck extension 52 which is secured to the prewinder body 42 by means not shown. The foot piece 51 is provided with an interior thread 60 according to the form and desired outer diameter to which a wire coil screw thread insert C is to be contracted by the tool immediately preceding the insertion into the thread-provided hole H of a boss or nut member B indicated in Fig. 2. Between the foot 51 and the tubular piece 48 and over a length at least equal to that of the largest coil insert for which the tool is destined, the prewinder body 42 and the neck 52 are laterally recessed at 53 through 180 degrees. Adjacent at least a portion of that recess the outer diameter of the neck 52 is slightly reduced and the inner diameter of the body 42 is slightly increased so that a semi-circular slot 54 is formed. A spring clip 55 engages in that slot and is so bent as to retain the insert coil C fed into the recessed portion or feed chamber 56 of the prewinder. This clip simultaneously serves the purpose of causing a delay in the shifting of the coil C in the chamber as it will be described hereinafter.

In order to ensure proper operation of the tool it is necessary that the mandrel spring 38 have a low spring rate and that it is softer than the clutch spring 29. However, the force necessary to compress spring 29 sufficiently to cause the engagement of the clutch elements 19 and 20 should be equal to the force of spring 38 when the latter has been compressed by the mandrel moving from the position of Fig. 1 towards the tool head 11 into the position of Fig. 2, that means only a portion of the length of the slots 33. The spring rate of spring 50 may also be low as it serves merely to return the prewinder from the extended position of Fig. 1 after it had been pushed inward in relation to the tool body 10 during the use of the tool as it now will be described.

Before using the tool screw bolt 24 and plug 22 will be removed, nut 14 will be screwed on the stationary part P and clutch element 19 and nut 28 on the shaft R of the prime mover which now may be started to rotate the element 19. Then, a wire coil screw thread insert C may be charged into the feed chamber 56 of the prewinder with the tang T of the coil facing the foot 51 where it will be held by the spring clip 55 while the tool is still in the extended position of Fig. 1. Preferably the insert C is initially so located in the chamber 56 that there is a free space between the insert and the foot 51. The tool axis will be brought into registry with the internally threaded hole H into which the coil is to be inserted, and which for the sake of the following description shall be assumed to be vertical; but it is to be understood that the tool is equally operative in any other position or inclination of its axis. The foot 51 will be brought to bear on the surface S in which the hole is provided. Thereupon, the tool body 10 with head 11 and the connected prime mover parts will be lowered in relation to the prewinder 41 thereby compressing spring 50. The mandrel will also be taken along in the axial direction without rotation owing to the springs 29 and 38 tending to hold the associated parts in their relative position of Fig. 1. In consequence, the mandrel will enter into the interior of the coil C so that the tang T can engage the mandrel slot 40. When the downward movement of the tool body 10 continues, the mandrel 34 bearing with the bottom of its slot 40 on the coil tang will first tend to shift the coil downward towards the foot 51. However, the clip 55 frictionally bearing on the coil C will set up a resistance to such shift with the result that the mandrel will be urged with its neck portion 35 inwards in the tubular extension 31 against the restraint of the soft spring 38. A point will be reached where the force of the compressed spring 38 overcomes the force of the clutch spring 29 so that the clutch element 20 with the extension 31 which is secured thereto by pin 32 will be shifted upwards until the dogs 20' of the element 20 engage the dogs 19' of the rotating element 19. In consequence, clutch element 20 will also start to rotate and with it the sleeve 31 and the mandrel 34 which engages with its pin 37 the slots 33 of the sleeve. Owing thereto, the restraint of the clip 55 will be overcome, the coil will be turned and the compression of spring 38 will cause the mandrel simultaneously to shift the coil downwards so as to engage the top face of the foot 51. The rotating mandrel will then screw the tang-provided end of the coil into the thread 60 and further into the thread provided hole H which the coil is intended to line. During its rotation the mandrel enters deeper and deeper into the sleeve 31 thereby further compressing the soft spring 38. It will be noted that the thrust applied at the coil tang is always equal to the compression force of spring 38 and that the clutch spring 29 plays no part in pushing the mandrel forward. The maximum depth to which a coil can be inserted is limited when the end face 61 of the piece 43 which is secured to the end of the prewinder body 42 abuts against the inner end face 62 of the head piece 11. When this happens, the mandrel neck 35 cannot enter any deeper into the sleeve 31. Nevertheless, the rotation continues causing also a continuation of the movement of the coil axially inward in respect to the hole into which it is screwed. The mandrel bearing with a bottom of its slot 40 on the coil tang follows such axial movement under the pressure of the spring 38 until this pressure sinks below that of the clutch spring 29 which, then, will expand so as to separate the clutch elements 19 and 20 from each other and, thereby, to stop the rotation of the mandrel. In this step of operation the slightest expansion of spring 29 will cause the disengagement of the clutch owing to the mentioned shallowness of the teeth 19' and 20'.

It has been stated, and this is an essential feature of the invention, that at the time the mandrel engages the coil tang, the parts do not rotate in relation to each other, and that if the tang and slot 40 register when the mandrel comes down, rotations of the mandrel and of the coil start simultaneously but not before the tang bears on the bottom of the slot 40. In the event, the tang and slot 40 are not in registry when the mandrel comes down, the end face 63 of the latter will bear on the tang. The mandrel will first compress spring 38 so far that compression of spring 29 and engagement of the clutch occur. Thereby, the mandrel will start to rotate as hereinbefore described. As soon now, as the mandrel slot 40 registers with the tang, the mandrel will be shifted by spring 38 in axial direction so that the tang enters the slot 40 and bears against the bottom thereof. This movement is accompanied by a decrease of the compression of spring 38 resulting also in a corresponding decrease of the compression of spring 29 so as to cause the immediate disengagement of the clutch. Considering that a decrease of the compression of each of the springs is accompanied by an increase of its length, and further that according to what has been stated hereinbefore, spring 38 is softer than spring 29, it will be obvious that in order to obtain the desired effect the mandrel end must be engageable with the screw member to be driven over a distance in the axial direction at least as long as, but for all practical purposes, appreciably longer than the one clutch element is engageable by the other one. Thus, with respect to the illustrated embodiment, Fig. 1 clearly shows the depth of the slot 40 to be equal to three to four times the height of the clutch teeth 19' and 20'. Therefore, at the moment the tang reaches the slot bottom no torque is further prevalent which might damage the tang owing to a rotary impact, and the conditions are now the same as in the first mentioned case where tang and slot registered from the start. In other words, the mandrel bearing with its slot bottom on the tang must again be shifted inward in sleeve 31 so as to compress both the springs 38 and 29 and to start to rotate.

The tool will operate in the manner just described if the body 10 with the prime mover is lowered with an adequate speed, that means not too fast. But even if an unskilled user pushes the body 10 very rapidly downward, the clip 55 will retard the shifting of the coil C against the prewinder foot and thereby prevent the occurrence of a harmful impact.

It has been stated the depth to which the coil can be inserted is reached when the face 61 abuts against the face 62. Hence the maximum depth is defined by the distance of an abutment from the face 61 when the prewinder is in its end position. Therefore, in order to render the tool adjustable for varying depths, the invention provides an abutment which is adjustable as to its distance from the face 61 in the inoperative position. For this purpose, a sleeve 70 preferably knurled at 81 is slidingly arranged on the tool body 10 which is provided with an axial slot 71 extending a distance from the head end of the body 10 towards the foot end. In registry with slot 71 the neck portion 12 of the head 11 is also slotted at 72. A pin 73 is secured in sleeve 70 and projects through slot 71 into the interior of the body 10 and also into the slot 72 when the sleeve 71 is in its end position shown in Figs. 1 and 2. An adjusting sleeve 74 which also may be knurled at 82 has an inner diameter equal to the outer diameter of sleeve 71 so that it can overlap with its adjacent end portion the pin-provided portion of sleeve 71. The other end of sleeve 74 forms an inwardly projecting and internally screw threaded flange 76 which engages an external thread 77 extending over the major length of the head piece 11. The end 75 of sleeve 74 is provided with a plurality, e. g. four, substantially L-shaped, equally spaced, slots 78 to be selectively engaged by the outer end of pin 73 in bayonet fashion as shown in Fig. 3. It is to be noted that the dead end arm 79 of each slot 78 is slightly inclined with its end towards the adjacent edge of the sleeve 74. A spring 80 is interpositioned between sleeve 70 and the inner flange of sleeve 74 urging the sleeves apart. Owing to the inclination of the slot arm 79 and the arrangement of the spring 80, the latter tends to turn sleeve 74 so that the pin 73 firmly bears against the end of the slot arm 79 which it engages, and that any force trying to turn sleeve 74 in the other direction would have to overcome the effect of the spring.

Now, in order to adjust the position of the pin 73, first sleeve 74 will be turned in relation to sleeve 70 so that the pin 73 moves from the dead end of the slot arm 79 it engages to the other arm of the slot, and the spring 80 will push the sleeve 70 downward in Fig. 2. Thereupon sleeve 74 may be freely turned and screwed on thread 77 into any desired position as far as the thread extends. When such a position is reached, sleeve 70 will be pushed upwards against the restraint of spring 80 and, if necessary, sleeve 74 will be turned a little more in the one or other direction so that the pin 73 can enter the nearest slot 78 and proceed into its arm 79 where it is restrained by the action of spring 80. In this adjusted position pin 73 will have been partly or entirely moved out of the recess 72 of the head portion 12 so as to constitute an abutment for the face 61 at a distance shorter than that defined by the face 62 and thereby setting a smaller depth for the insertion of the coil C. In this manner if there are four slots 78 in sleeve 74 and e. g. 32 convolutions per inch of the thread 77 the depth to which the insert will be screwed in can be adjusted correctly within tolerances of plus and minus .008". It is also noteworthy that no wrench is required to make the adjustment.

Fig. 3 shows the tool and the coil in their position at the end of a coil-inserting operation, the clutch having been disengaged and rotation of the mandrel having stopped. As soon now as the tool is lifted from the surface S all parts will be automatically returned by springs 38 and 50 to their original extended position of Fig. 1 in which the tool is ready to receive another coil for insertion into a tapped hole of a boss.

It will be apparent to those skilled in the art that many alterations and modifications of the structure illustrated and described can be made without departure from the essence and spirit of the invention.

For instance the prewinder foot may be omitted if either it is not required to contract the coil before it is screwed into the hole H or when the screw member is of a kind other than a wire coil. In such a case it will be necessary only to provide for a feed chamber and a retaining element, such as the chamber 56 and clip 55. Furthermore, it will be noted that the prewinder 41 and the body 10 and associated parts can be dispensed with if it is not necessary to adjust or limit the driving depth and if it is merely the question of causing the engagement of the mandrel or driving element with a screw member while there is no relative rotation of the two, i. e. without any rotary impact. Therefore, the invention shall not be limited but by the scope of the appended claims.

I claim:

1. A tool of the kind described comprising in co-axial arrangement a dog clutch and a mandrel, the clutch including a first and a second clutching element, a first spring between said elements tending to separate them, means to secure said first element to a rotary shaft of a prime mover, and a tubular extension of said second element on the side remote from said first element, one end portion of said mandrel being telescopically shiftable and guided for common rotation in said extension, a second spring softer than said first spring between said mandrel end portion and the body of said second element to project said mandrel, the opposite mandrel end being shaped for engagement of the end of a screw thread wire coil from the inside of said coil, said opposite mandrel end being engageable by said coil end through a distance greater in the axial direction than the height of the dogs of one of said clutch elements, a tubular member surrounding said clutch, said extension and at least a portion of said mandrel, and including means to secure it to a stationary part of said prime mover, a substantially tubular foot member telescopically shiftable and non-rotatable in respect to said tubular member, said foot member including a prewinder at its outer end, the portion of said foot member adjacent said prewinder forming a laterally recessed feed chamber for said wire coil, a resilient clip attached to said foot member so as to overlap a portion of said recess and to hold resiliently said wire coil in said chamber, said foot member further including an inner portion in which said mandrel is guided, a third spring between said tubular member and said foot member so as to tend to project the latter, and an abutment in said tubular member for said foot member to limit an inward shift of the latter.

2. A tool of the kind described comprising in co-axial arrangement a clutch and a mandrel, the clutch including a first and a second clutching element, a spring between said elements tending to separate them, means to secure said first element to a rotary shaft of a prime mover, and a tubular extension of said second element on the side remote from said first element, one end portion of said mandrel being telescopically shiftable in and connected for common rotation to said extension, a second spring between said mandrel end portion and the body of said second element to project said mandrel, the opposite mandrel end being shaped for engagement of a screw member, a tubular member including means to secure it to the stationary part of said prime mover and surrounding said clutch, said extension and at least a portion of said mandrel, a foot member telescopically shiftable in respect to said tubular member, an abutment on said tubular member in the path of said first member to limit its retraction, a third spring between said tubular member and said foot member so as to tend to project the latter, said tubular member being provided with an axial slot and including a head engageable by said means to secure it to said stationary part and being provided with an external thread, a sleeve shiftable on said tubular member, a pin secured to said sleeve and projecting through said axial slot into the interior of said tubular member so as to form said abutment, a second sleeve including an internally threaded flange substantially at the one end of said second sleeve and engaging said thread of said head, the other end of said second sleeve being adapted to overlap said first sleeve and being provided with a plurality of bayonet slots to receive therein selectively the outer end of said pin, and a spring between said sleeves to ensure the bayonet engagement of said pin and the selected slot.

References Cited in the file of this patent
UNITED STATES PATENTS

| | | |
|---|---|---|
| 1,539,782 | Stansell | May 26, 1925 |
| 2,227,627 | Bruzon | Jan. 7, 1941 |
| 2,453,840 | Geertsema | Nov. 16, 1948 |
| 2,484,655 | Shreve | Oct. 11, 1949 |
| 2,625,967 | Stull | Jan. 20, 1953 |